United States Patent [19]
Yoshikawa et al.

[11] Patent Number: 5,504,835
[45] Date of Patent: * Apr. 2, 1996

[54] VOICE REPRODUCING DEVICE

[75] Inventors: Shuichi Yoshikawa, Nara; Takahiko Nakano; Yasumoto Murata, both of Ikoma, all of Japan

[73] Assignee: Sharp Kabushiki Kaisha, Osaka, Japan

[*] Notice: The portion of the term of this patent subsequent to Jun. 28, 2011, has been disclaimed.

[21] Appl. No.: 885,375

[22] Filed: May 19, 1992

[30] Foreign Application Priority Data

May 22, 1991 [JP] Japan ................................. 3-117383

[51] Int. Cl.⁶ ........................................... G10L 9/00
[52] U.S. Cl. ............................................ 395/267
[58] Field of Search .................. 381/51; 395/2.21, 395/2.39, 2.67, 2.79, 2.81

[56] References Cited

U.S. PATENT DOCUMENTS

| | | | |
|---|---|---|---|
| Re. 34,295 | 6/1993 | Shibuya et al. | 341/133 |
| 3,909,533 | 9/1975 | Willimann | 381/40 |
| 4,209,844 | 6/1980 | Brantingham et al. | 364/724 |
| 4,271,332 | 6/1981 | Anderson | 395/2.67 |
| 4,335,277 | 6/1982 | Puri | 395/2 |
| 4,344,148 | 8/1982 | Brantingham et al. | 364/724 |
| 4,618,982 | 10/1986 | Horvath et al. | 395/2.28 |
| 4,746,900 | 5/1988 | Shibuya et al. | 340/347 A D |
| 5,029,198 | 7/1991 | Walpole et al. | 379/88 |
| 5,060,267 | 10/1991 | Yang | 395/2.67 |

Primary Examiner—Allen R. MacDonald
Assistant Examiner—Michelle Doerrler
Attorney, Agent, or Firm—Nixon & Vanderhye

[57] ABSTRACT

A voice reproducing device includes a data generator for sequentially providing digital data as an initial value to a recurrence equation and for generating a prescribed number of data with each given an initial value, a decoder for controlling the polarity of its output and the output time thereof in accordance with the data generated by the data generator and for outputting a pulse accordingly, and an analog integrating circuit for integrating the pulse output from the decoder.

10 Claims, 2 Drawing Sheets

VOICE REPRODUCING DEVICE

BACKGROUND OF THE INVENTION

1. Field of the Invention

The present invention relates generally to a voice reproducing device, and more particularly, to a voice reproducing device used in an electronic apparatus for reproducing voice messages, voice guidance or the like.

2. Description of the Prior Art

When encoding a voice signal for storage in a semiconductor memory, if conventional pulse code modulation (PCM) is used, it is not possible to make a long recording of a voice message because of the limited capacity of the expensive semiconductor memory. Therefore, a method called Adaptive Differential PCM, or ADPCM, which provides enhanced data compression efficiency, is often employed in a voice reproducing device.

In the ADPCM method, data compression is achieved by encoding only the differential information derived from the correlation between voice signal elements. When the differential information is encoded, the quantization width is adaptively changed to increase responsiveness to the original waveform, thereby improving the signal-to-quantization-noise ratio (SNR).

A typical voice reproducing device utilizing the ADPCM method may be constructed, for example, as shown in FIG. 3, so that digital data read from a data ROM 21 is transferred to both a quantization width controller 22 and an inverse quantizer 23. Based on the supplied digital data, the quantization width controller 22 controls the quantization width by gradually expanding it when the maximum quantization value continues and gradually reducing it when the minimum quantization value continues. The inverse quantizer 23 converts the digital data to linear-quantized data in accordance with the quantization width set by the quantization width controller 22. Since the digital data output from the inverse quantizer 23 represents the differential information of the original voice signal, the digital data is integrated by a digital integrator and is then converted to an analog signal by a D/A converter 25 to reconstruct the original sound of the voice.

However, in the above constructed voice reproducing device, the quantization width controller 22 requires the use of a complicated multiplier and adder. Furthermore, a high-precision resistor and operational amplifier are needed for the D/A converter 25. Moreover, because of the employment of ADPCM, the maximum attainable data compression ratio is one bit per sampling period.

Thus, typical prior art voice reproducing devices have suffered from complicated circuit configurations and a limit to the data compression ratio. Further, the high cost and complexity of the required components has made reducing the overall size and cost of the devices difficult.

It would be desirable to provide a voice reproducing device capable of improving the data compression ratio while simplifying the hardware construction.

SUMMARY OF THE INVENTION

The voice reproducing device of the present invention, permits the reproduction of a voice message without complicated circuitry such as an D/A converter, a multiplier or an adder, while improving the data compression ratio.

In accordance with one embodiment of the present invention, a voice reproducing device includes a data generator for sequentially providing digital data as an initial value to a recurrence equation and for generating a prescribed number of data with each given an initial value, a decoder for controlling the polarity of its output and the output time thereof in accordance with the data generated by the data generator and for outputting a pulse accordingly, and an analog integrating circuit for integrating the pulse output from the decoder.

BRIEF DESCRIPTION OF THE DRAWINGS

This invention may be better understood and its numerous objects and advantages may better become apparent by reference to the accompanying drawings.

DESCRIPTION OF THE PREFERRED EMBODIMENTS

Figure 1:
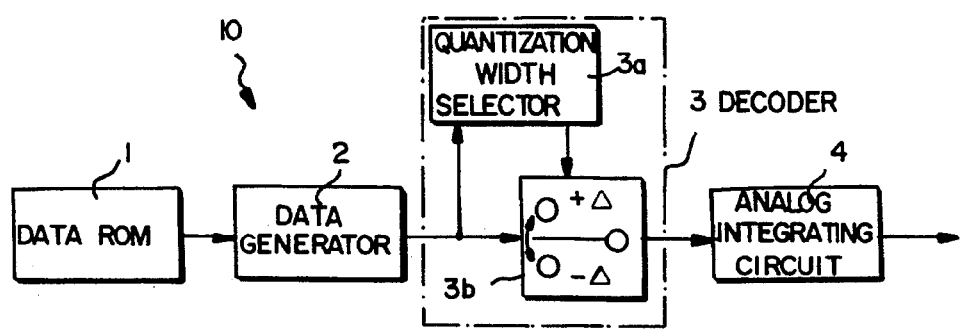
FIG. 1 is a block diagram illustrating a configuration of a voice reproducing device according to the present invention.
Figure 3:
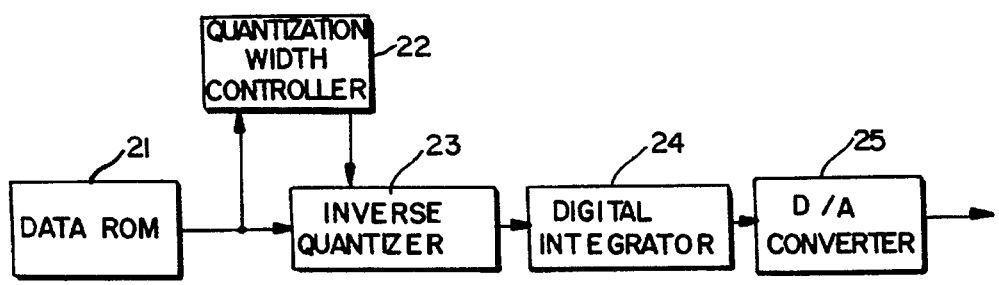
FIG. 3 is a block diagram illustrating a typical configuration of a prior art voice reproducing device.

With reference to the figures, and initially to FIG. 1, there is shown a voice reproducing device 10 in accordance with the present invention. The voice reproducing device 10 includes a data ROM 1 for storing encoded data related to a voice signal, a data generator 2 for generating a data sequence from such stored data, a decoder 3 for decoding the generated data sequence in the form of a pulse, and an analog integrating circuit 4 which recreates the original signal from such pulse.

In operation, digital data is read from the data ROM 1 and transferred to the data generator 2. The data generator 2 sequentially provides the digital data to a recurrence equation as an initial value, from which the equation generates a prescribed number of data values.

The recurrence or difference equation is an equation for infinitely generating data trains by sequentially performing calculations with given initial values. With the same initial value, the data trains generated are always identical. Therefore, using the recurrence equation, it is possible to randomly access any desired data train by providing the appropriate initial value. The recurrence equation may be implemented either in software or in hardware.

The recurrence equation employed by the data generator 2 is equivalent to that used for encoding the voice signals stored in the data ROM 1. In the encoding process, a voice signal is encoded by ADPCM, and the encoded data is then compared with a large number of data sets generated by sequentially providing initial values to the recurrence equation. The initial value for the recurrence equation which achieves the closest approximation to the encoded voice signal is adopted as the data for storage in the ROM 1. In the encoding process, a code book may be used in which the relationship between the address and the data stored at that address is equivalent to the relationship between the initial value for the recurrence equation and the data generated by that initial value. As a result, the data generated by the data generator 2 approximates the data obtained by encoding the original voice signal by ADPCM. Also, since the recurrence equation performs a prescribed number of calculations with each given initial value, thereby generating data of a larger bit count than the initial value, the digital data that provides the initial value can be created by further compressing ADPCM encoded data.

The data that the recurrence equation generates with each given initial value must approximate as closely as possible the original data encoded by ADPCM. Pseudo random numbers are an example of a recurrence equation which may generate such data. Specifically, pseudo-random numbers generated by an m-sequence (maximum-length linearly recurring sequence) that can attain uniform distribution in multidimensional space may be best suited for such application. In pseudo-random numbers, the initial value is called the seed.

When the prescribed number of data values has been generated by the data generator 2 as described above, the decoder 3 determines and sets the polarity of its output and the output time thereof in accordance with the data and outputs a pulse accordingly. More specifically, a quantization width selector 3a, as shown in FIG. 1, controls the output time by measuring the timing to turn off a switch 3b in accordance with the data, thereby controlling the quantization width in the ADPCM method. However, since the output time is determined individually and uniformly according to each input data, there is no need to provide a complicated circuit such as a multiplier or an adder. The switch 3b selects the plus or minus sign for the output according to the data. The decoder 3 adaptively decodes one-bit data encoded by ADM (adaptive delta modulation); therefore, the output pulse is directly fed to an analog integrating circuit 4 for demodulation into the original analog voice signal without being processed through a D/A converter.

Figure 2:
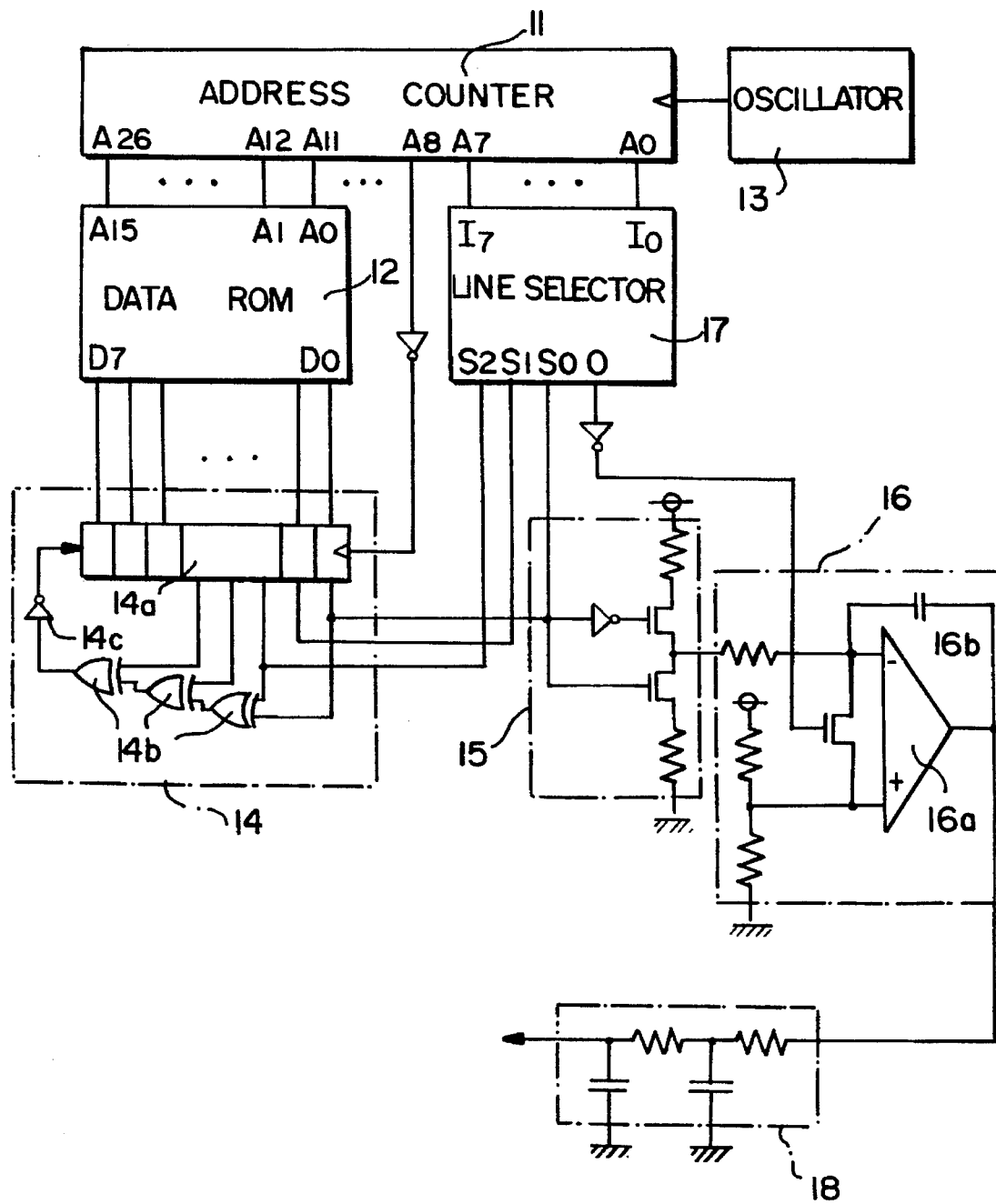
FIG. 2 is a block diagram illustrating a configuration of one embodiment of the present invention.

FIG. 2 is a block diagram illustrating a configuration of a voice reproducing device in accordance with one embodiment of the present invention.

In the voice reproducing device of this embodiment, the higher 16 bits (bit 26–11) of the output of an address counter 11 are connected to the 16-bit address input of a data ROM 12. The address counter 11 is a circuit that sequentially outputs 27-bit digital signals by counting input pulses generated on the basis of the oscillation frequency of an oscillator 13. The address counter 11 provides a count output to the data ROM 12 at a rate equal to the oscillation frequency of the oscillator 13 divided by $2^{11}$. The data ROM 12 is a byte address ROM in which 8-bit digital data is stored in address sequence. Each 8-bit digital data value sequentially read out of the data ROM 12 by a count output from the address counter 11 is input in parallel to an 8-bit shift register 14a in a pseudo-random number generator 14.

In the pseudo-random number generator 14, each bit in the shift register 14a is sequentially shifted to the next higher significant place by being clocked with the 8th bit output of the oscillator 13. The bits in the higher stages of the shift register 14a are XORed using three exclusive OR circuits 14b. The final result of the XOR operation is inverted by a NOT circuit 14c for input to the first stage of the shift register 14a, thus generating m-sequence pseudo-random numbers. That is, the pseudo-random number generator 14 is capable of serially generating an 8-bit pseudo-random number based on the initial value at a frequency of 256 (=$2^8$), which means that every time one digital data value is given as the initial value from the data ROM 12, the shift register 14a performs 16 shifts to output data sequentially from the high-order stage.

Each bit thus output sequentially from the 8th stage of the pseudo-random number generator 14 is transferred via a plus/minus sign selector circuit 15 to an analog integrating circuit 16. The plus/minus sign selector circuit 15 is an interface circuit that outputs a high or low level signal depending on the bit supplied from the pseudo-random number generator 14. The analog integrating circuit 16 is a circuit that integrates the high or low level signal output from the plus/minus sign selector circuit 15, using a capacitor 16b connected in negative feedback to an operational amplifier 16a. The signal from the analog integrating circuit 16 is then passed through an anti-aliasing filter 18 and is output as a reproduction signal.

The data from the higher three stages of the pseudo-random number generator 14 are input to a line selector 17. The line selector 17 is a circuit which, based on the outputs from the lower 8 bits of the address counter 11, divides the period in which the shift register 14a of the pseudo-random number generator 14 performs one shift operation, in order to make the analog integrating circuit 16 perform the operation of integration for the time that matches the 3-bit data entered.

In operation, the address counter 11 sequentially outputs 27-bit address signals by counting input pulses generated on the basis of the oscillation frequency of the oscillator 13. An address from which to read data stored in the data ROM 12 is specified by the address signal output from the higher 16 bits of the output terminals of the address counter 11. The output signal from the lower 8 bits of the output terminals of the address counter 11 is fed to the line selector 17. One of such input signals is selected by a 3-bit data select signal for output at a terminal O. Digital data is read out of the data ROM 12 at a rate equal to the oscillation frequency of the oscillator 13 divided by $2^{11}$, and is input in parallel to the shift register 14a of the pseudo-random number generator 14.

In the pseudo-random number generator 14, every time one digital data value is given as the initial value from the data ROM 12, the shift register 14a performs 16 shifts to output data sequentially from the high-order stage. Each data output from the 8th stage of the shift register 14a is sequentially transferred via the plus/minus sign selector circuit 15 to the analog integrating circuit 16 where the data is integrated by the plus or minus sign that matches its value.

The data from the higher three stages of the pseudo-random number generator 14 are input to the line selector 17. The analog integrating circuit 16 performs the integration operation for the time that matches the 3-bit data. As a result, in the analog integrating circuit 16, when integrating the plus or minus sign by one-bit data, the integrating time is controlled so that the analog integrating circuit 16 integrates the signal adaptively decoded from ADM encoded one-bit data. Thus, the original voice signal can be reconstructed directly without using a D/A converter. The reconstructed analog signal is passed through the anti-aliasing filter 18, where high frequency components are removed, for reproduction as a voice signal.

Thus, according to the voice reproducing device of this embodiment, by generating data using the pseudo-random number generator 14, encoded data can be further compressed for storage in the data ROM 12. Furthermore, since one-bit encoded data generated by the pseudo-random number generator 14 is adaptively decoded, the original analog voice signal can be directly reproduced from the analog integrating circuit 16 without using an expensive D/A converter. Moreover, data used to adaptively control the integrating time of the analog integrating circuit 16 can be obtained directly from the higher three stages of the pseudo-random number generator 14, thereby eliminating the need for a quantization width controller that uses a complicated multiplier and adder.

As is apparent from the above description, according to the voice reproducing device of the present invention, the use of a pseudo-random number generator or the like for data generation serves to simplify the hardware construction while achieving a further improvement in the data compression ratio.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A voice reproducing device comprising:

data generating means for sequentially providing digital data as an initial value to a recurrence equation and for generating a prescribed number of data for each given initial value;

decoding means for controlling output polarity and output time in accordance with the data generated by the data generating means and for outputting a pulse accordingly; and an analog integrating circuit means for integrating the pulse output from the decoding means to produce an analog voice signal during the output time.

2. The voice reproducing device of claim 1, including storage means for storing encoded voice messages.

3. A voice reproducing device comprising:

data generating means for sequentially providing digital data as an initial value to a recurrence equation and for generating a prescribed number of data with each given initial value;

decoding means for controlling output polarity and output time in accordance with the data generated by the data generating means and for outputting a pulse accordingly; and an analog integrating circuit means fir integrating the pulse output from the decoding means to reproduce a voice signal during the output time, further including a filter for removing high frequency components of the output of the analog integrating circuit.

4. The voice reproducing device of claim 3, wherein the filter is an anti-aliasing filter.

5. A voice reproducing device, comprising:

data generating means for generating a prescribed number of data;

decoding means for outputting a series of pulses, said decoding means including means for controlling a polarity and duration of said pulses based on said generated data; and analog integrating circuit means coupled to an output of said decoding means for integrating said series of pulses to produce an analog voice signal for the duration.

6. The voice reproducing device of claim 5, wherein said data generating means comprises means for providing digital dam as an initial value to a recurrence equation in order to generate said prescribed number of data.

7. The voice reproducing device of claim 6, wherein said data generating means further comprises a shift register for carrying out said recurrence equation.

8. The voice reproducing device of claim 5, further including a filter for removing high frequency components of an output of said analog means.

9. The voice reproducing device of claim 8, wherein the filter is an anti-aliasing filter.

10. A device for reproducing an analog voice signal from encoded data bits representing initial seed values each corresponding to one of a plurality of recurrence equations applied to encode the voice signal, the device comprising:

a data generator having an input for the encoded data bits, a pseudo-random number generator adaptively converting each encoded data bit into a multi-bit data pulse output representative of the one of a plurality of recurrence equations corresponding to the encoded data bits, and an output for the multi-bit data pulse output;

a sign signal selector circuit having an input for the multi-bit data pulse output frown the data generator, a sign signal circuit generating a sign signal in response to the input, and an output for the sign signal; and an analog integrating circuit having an input for the sign signal of the sign signal selector, an integrating circuit for integrating the sign signal to form an analog reproduced voice signal, and an output for the analog reproduced voice signals.

* * * * *